United States Patent [19]

Nelson

[11] 3,748,535

[45] July 24, 1973

[54] WATER COOLED DIRECT BURIED ELECTRICAL EQUIPMENT
[75] Inventor: Rolland D. Nelson, Waukesha, Wis. 53186
[73] Assignee: RTE Corporation, Waukesha, Wis.
[22] Filed: Jan. 3, 1972
[21] Appl. No.: 214,563

[52] U.S. Cl. .................. 317/15, 174/6, 174/15 R, 174/37, 336/55 X, 336/61 X, 307/95
[51] Int. Cl. ............................................. H02h 7/04
[58] Field of Search ..................... 317/14 R, 15; 307/17, 95, 149, 154; 336/55, 61; 174/6, 15 R, 18, 37; 204/196, 197

[56] References Cited
UNITED STATES PATENTS
3,405,283  10/1968  Leonard ............................ 174/37
3,602,726  8/1971  Toedtman .......................... 307/95

FOREIGN PATENTS OR APPLICATIONS
696,201  8/1953  Great Britain ..................... 174/18

OTHER PUBLICATIONS
Jastrzebski; Engineering Materials, 1966, pp. 543–548.
Jastrzebski; Engineering Materials, 1966, pp. 543–548.

Primary Examiner—J. D. Miller
Assistant Examiner—Harvey Fendelman
Attorney—Ronald E. Barry et al.

[57] ABSTRACT

An apparatus for attracting or drawing water toward the surface of a direct buried enclosure for electrical equipment, the enclosure having an electrically conductive outer surface connected to a source of DC potential within the enclosure and a ground rod connected to the neutral of the electrical system and buried in a spaced relation to the enclosure, the surface of the enclosure being anodic with respect to the ground rod whereby water in the vicinity of the ground rod will be attracted toward the surface of the enclosure.

10 Claims, 1 Drawing Figure

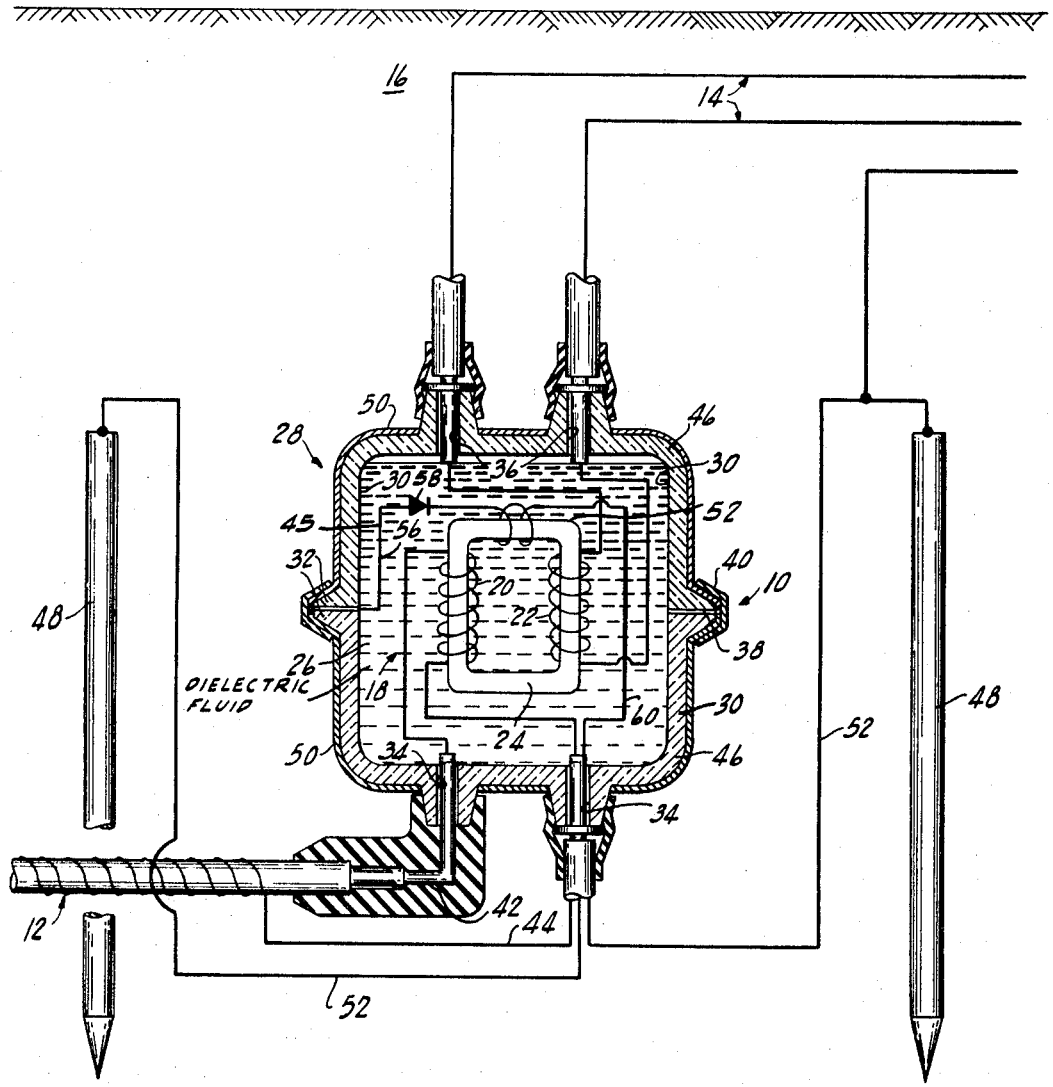

WATER COOLED DIRECT BURIED ELECTRICAL EQUIPMENT

BACKGROUND OF THE INVENTION

Variations in environment in which underground systems are embedded present situations which seen almost insurmountable to the development of an enclosure for prolonged protection of the electrical equipment of the underground system. Electrical euipment includes not only the transformer but also capacitors, some switching equipment and even cable conduits. The hardness of the soil, moisture content, pH of the water and thermoconductivity of the soil are only a few of the environmental problems which must be considered in preserving the life of the enclosure. The dissipation of heat under any of the aforementioned soil conditions has been found to have a direct effect upon the operation of the electrical equipment. It is generally recognized that a direct buried unit dissipates heat by conduction only and that a pole mounted unit dissipates heat by both convection and radiation to the air. Since the earth media is considered immobile, whether it be wet or dry, it is only when an ample supply of moisture is present that consideration can be given to other environmental conditions.

Water permeating through the soil is evaporated adjacent to the wall of the enclosure at temperatures near the water boiling temperature (100°C.). The evaporation of water is probably the most effective method by which the direct buried equipment may be cooled. By any other method, the thermal conduction of the soil or surrounding back fill will be the prime consideration. Below 100°C. temperature in moist soils, direct buried equipment can dissipate a remarkable level of watts per square inch as seen at the enclosure surface. As the soil dries, however, less and less heat dissipation can be depended upon. In dry lake sand it has been determined that heat dissipates at the rate of 0.17 watts per square inch at temperatures of 100°C. Even lower rates of heat dissipation in dry powdery soils can be encountered at these temperatures.

If the utility when installing the underground equipment could guarantee a supply of moisture in sufficient quantities to insure that the enclosure has a cooling sink or, even better, by evaporation of water, the requirements of design become simplified. A good bench mark for thermal design and evaluation of enclosures, particularly enclosures for transformers, can be established and a manufacturer can then produce a unit possibly even more economical than a pole-type of like KVA.

Moisture is readily available in most sections of the country by just burying the electrical equipment deep enough. The water table in many areas is near the surface and many of the present day vault installations have units operating in water since they were first installed. The problem, therefore, is prevalent primarily in arid sections of the country.

SUMMARY OF THE INVENTION

In the present invention, an electrical system is provided for establishing an anode-cathode relationship between the surface of the enclosure for the underground equipment and the neutral of the high voltage electrical system. The enclosure for the underground equipment can be made of an insulating material having a conductive outer surface or of a metallic material. The water is atracted to the surface of the enclosure by impressing a DC potential on the conductive surface so that the enclosure becomes anodic with respect to the neutral of the electrical system. An electric cell is thereby created in which the liquid or water present in the adjacent soil is impressed with an electric charge causing it to move toward the surface of the enclosure.

Other objects and advantages will become apparent from the following detailed description when read in connection with the accompanying drawing which is a schematic showing of the transformer arrangement of this invention.

DESCRIPTION OF THE INVENTION

Referring to the drawing, an underground distribution system is shown which includes an underground transformer unit 10 connected to a high-voltage cable 12 and secondary or service cables 14 buried in the ground 16. The transformer unit 10 includes a transformer 18 having a primary coil 20 and a secondary coil 22 wound on a core 24. The transformer 18 is immersed in a dielectric fluid 26 within a sealed enclosure 28. This is a standard arrangement for an underground system.

The enclosure 28 can be formed from a pair of bell-shaped sections 30 having flanges 32 extending outwardly from the periphery of the open end of each section. Primary cable lead openings 34 are provided in the lower section 30 and secondary or service line openings 36 are provided in the upper section 30. Means are provided for bonding the sections 30 together in the form of an insulating gasket 38 positioned between the two flanges 32 on the sections 30. Any appropriate means such as clamp assembly 40 can be used to hold the two sections together. The sections can be formed of a delectric material such as porcelain.

The primary coil 20 for the transformer 18 is connected through one of the openings 34 to the conductor 42 for the high-voltage cable 12 and is grounded to the concentric neutral 44 through the other opening 34. The secondary coil 22 is connected through the openings 36 to the service cables 14. The openings 34 and 38, respectively are sealed by any appropriate means.

In accordance with the invention, means are provided for attracting water in ground 16 surrounding the enclosure toward the outer surface 46 of the enclosure 28. Such means is in the form of an anode 50 provided on the surface 46 of section 30 and a number of ground rods 48 buried in the ground 12 at a distance from the transformer unit 10. It is generally understood that when you immerse two electrodes of opposite polarity in a fluid medium an electric cell is created in which particles or droplets of moisture impressed with an ionic charge will flow toward the electrode of opposite polarity. It is also generally understood that such flow will be in a direction from the cathode toward the anode.

In this regard, the outer surface of the enclosure 28, which may be formed of either a non-metallic or metallic material such as a noble metal, is provided with an electrically conductive surface. As seen in the drawing, a graphite coating 50 is applied to the outer surface of the enclosure. The ground rods 48 are connected to the concentric neutral 44 of the cable 12 by lines 52 and are spaced from the transformer unit 10, generally in a circle.

Means are connected to the transformer 18 to establish a direct current potential between the outer electrically-conductive coating 50 on the enclosure 28 and the ground rods 48. Such means is in the form of an electric circuit 45 which includes a coil 52 wrapped around the core 24 of the transformer 18 and a rectifier 58. The coil 52 is connected to the concentric neutral 44 by a lead wire 60 and to the coating 50 by a lead wire 56 which extends through the gasket 38 between the two flanges 32 of the enclosure sections 30. The rectifier 58 is provided in the lead wire 56 to provide a positive potential on the surface of the enclosure. A DC potential is thereby established between the ground rods 48 and the electrically conductive surface 50 through the coil 52 and rectifier 58. The conductive coating 50 forms the anode and the ground rods 48 form the cathode. A negative ionic charge will be impressed on the water particles surrounding the ground rods 48. The charged water particles will then negatively move toward the surface of the enclosure.

It should be noted that the direct current potential can be varied according to the temperature of the enclosure or the current flow in the electrical equipment. In either instance the water attraction capability of the system can be increased or decreased according to the temperature of the electrical equipment.

RESUME

The water attracting electrical system of the present invention has been described in connection with an underground transformer because it produces considerable heat due to internal losses which must be dissipated or else runaway temperatures and electrical failures will result. In this regard it has been the practice in the past to make the enclosure for the transformer cathodic with respect to the surrounding environment to reduce corrosion. The present system reverses the electrical relationship between the enclosure and the ground rods in order to achieve adequate cooling without increasing the corrosive action on the enclosure.

The present invention also has application to any underground electric equipment that is subject to high heat losses. The enclosure is made anodic to obtain the desirable effect of water attraction and normally produces an increase in corrosion effect. By making the enclosure out of a ceramic material with a conducting surface or out of a noble metal, the corrosion can be controlled.

I claim:

1. An apparatus for aiding in cooling electrical equipment buried in the ground within an enclosure, said apparatus comprising,
    means for providing an anode on the surface of said enclosure,
    means for providing a cathode in the ground in a spaced relation to said enclosure,
    and means for establishing a direct current potential between said anode and cathode.

2. The apparatus according to claim 1 wherein said anode means comprises an electrically conductive surface on said enclosure.

3. The apparatus according to claim 1 wherein said cathode means comprises a plurality of ground rods connected to said grounding system and spaced about the circumference of said enclosure.

4. The apparatus according to claim 1 wherein said direct current potential establishing means comprises an electric circuit of a transformer and a rectifier connected between said grounding system and said surface.

5. The apparatus according to claim 1 wherein said anode means includes an electrically conductive coating on the outer surface of said enclosure and said cathode means comprises a plurality of ground rods buried in the ground in a spaced relation to said enclosure.

6. The apparatus according to claim 5 wherein said means for establishing a direct current potential comprises an electrical circuit within said enclosure electrically connected to said coating and to said grounding system.

7. The apparatus according to claim 6 wherein said electric circuit includes a transformer and a rectifier for impressing a positive potential on said surface.

8. The system according to claim 1 wherein said enclosure is formed from porcelain and said electrically conductive surface comprises a graphite coating on the outer surface of said procelain.

9. An apparatus for cooling an enclosure for a high voltage transformer, the transformer having a primary coil electrically connected to a high voltage cable and a secondary coil electrically connected to a service cable,
    said apparatus including an electrically conductive surface on said enclosure, an electrically conductive member connected to the grounding system for said high voltage cable and being buried in a spaced relation to said enclosure,
    and an electric circuit means connected to said surface and said member for establishing a direct current potential between said surface and said member.

10. The apparatus according to claim 1 wherein said direct current potential means includes a transformer and a rectifier for providing a positive potential on said surface.

* * * * *